United States Patent [19]

Douglas

[11] 4,068,244
[45] Jan. 10, 1978

[54] FILM ADVANCE MECHANISM

[75] Inventor: Lawrence M. Douglas, South Easton, Mass.

[73] Assignee: Polaroid Corporation, Cambridge, Mass.

[21] Appl. No.: 720,007

[22] Filed: Sept. 2, 1976

[51] Int. Cl.² .............................................. G03B 17/50
[52] U.S. Cl. ...................................... 354/85; 354/86; 354/174; 354/204
[58] Field of Search .................................. 354/83-86, 354/174, 180, 204, 212

[56] References Cited
U.S. PATENT DOCUMENTS 3,984,851 10/1976 Goto ..................................... 354/212

Primary Examiner—John Gonzales
Attorney, Agent, or Firm—David R. Thornton

[57] ABSTRACT

Photographic apparatus has a film advance mechanism that advances the foremost film unit from within a cassette of stacked units by a major distance far longer than an access slot conventionally provided on the cassette for a short, index-like film advance. In a self-developing camera, the long advance can move an exposed film unit from the image surface to remotely-located spread rollers that initiate film processing.

The advance mechanism engages the film unit in a manner that avoids conventional structural limitations on the length of the advancing travel. One embodiment introduces a pick arm, which drivingly engages a back edge of the film unit, into the film cassette under a marginal flange; the arm is free to travel inside the cassette along a major portion of the cassette length. Another embodiment successively indexes the film unit forward through the conventional access slot of the cassette and engages an accessable frontal margin of the unit to pull it further along the path of advance.

30 Claims, 20 Drawing Figures

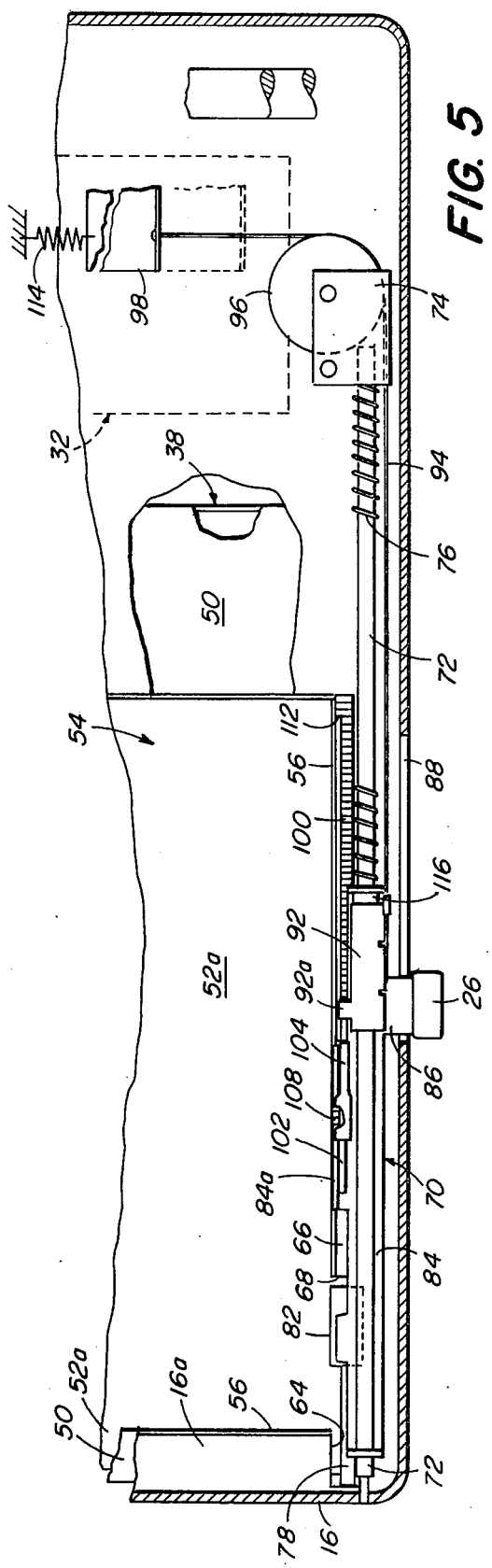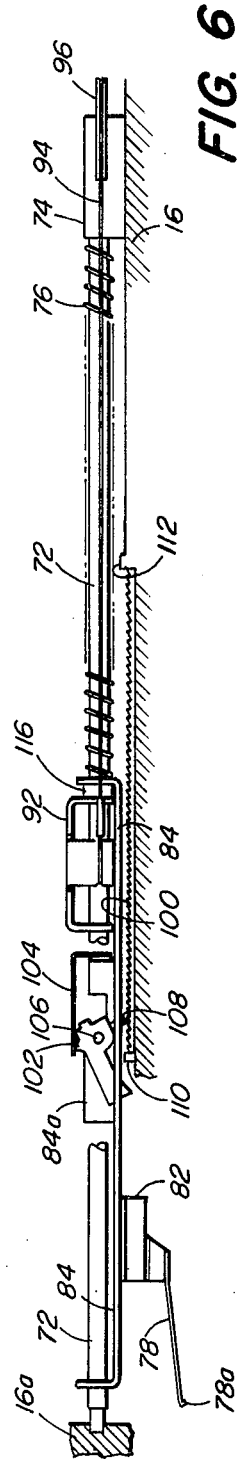

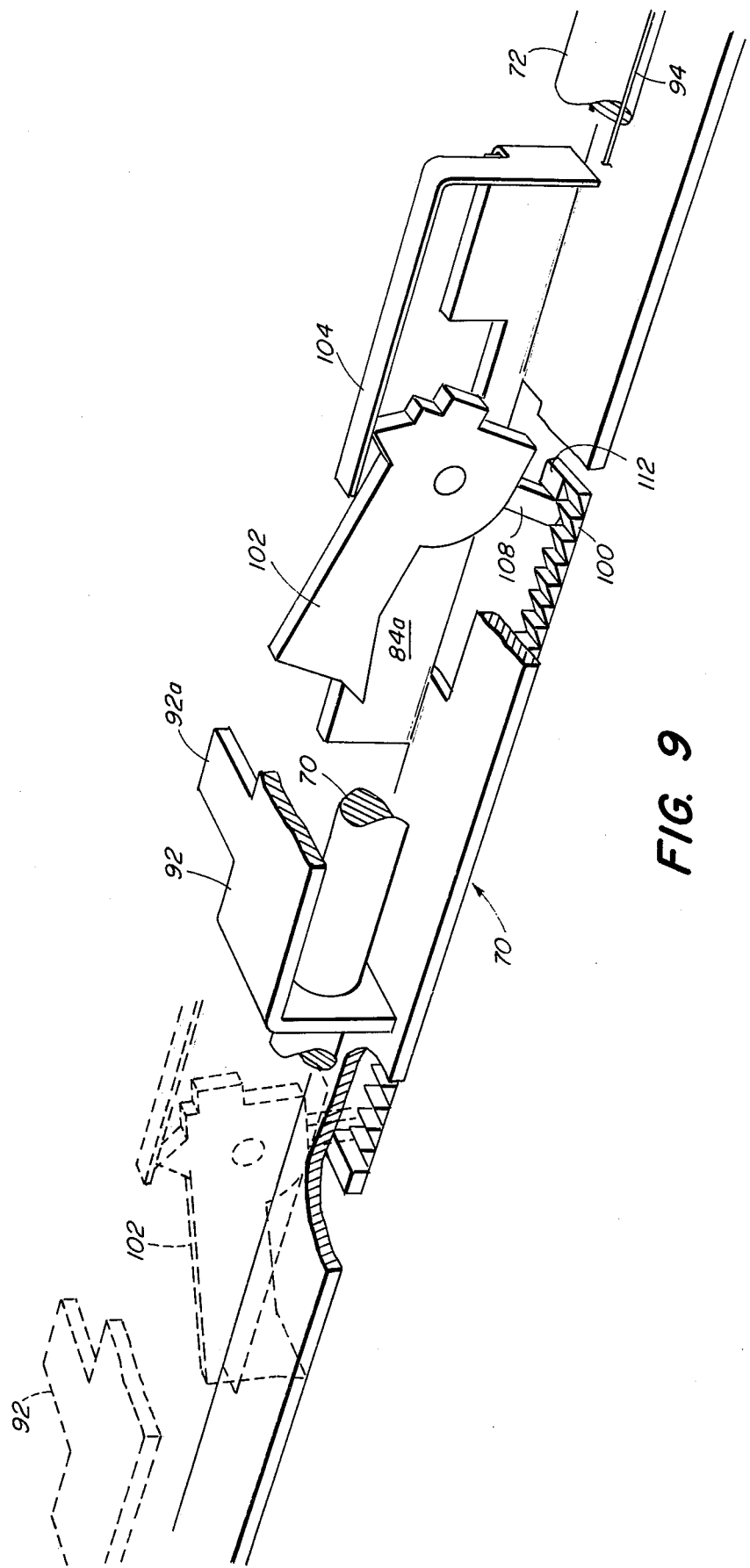

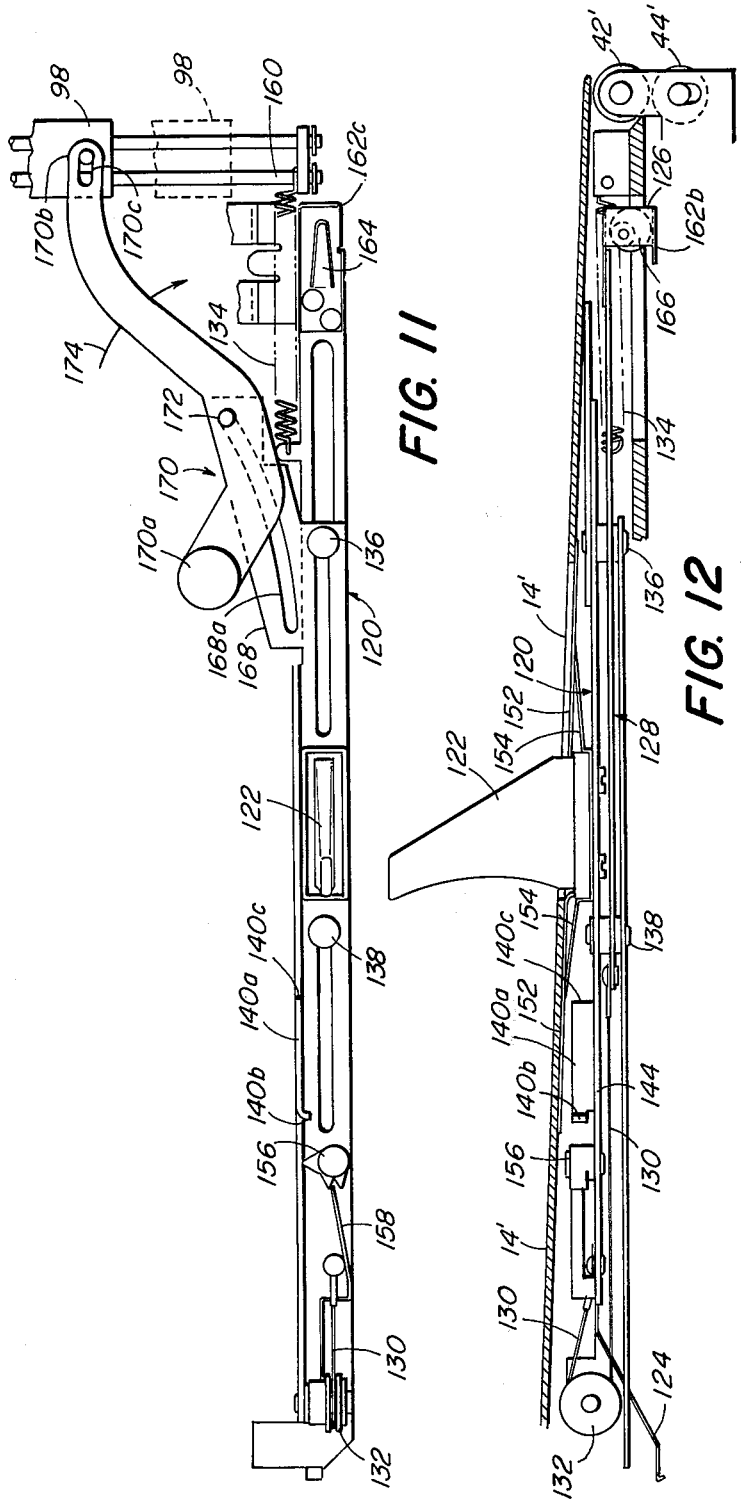
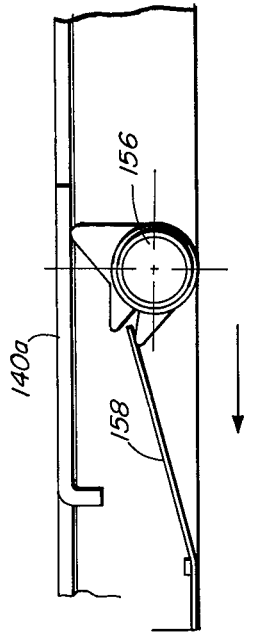
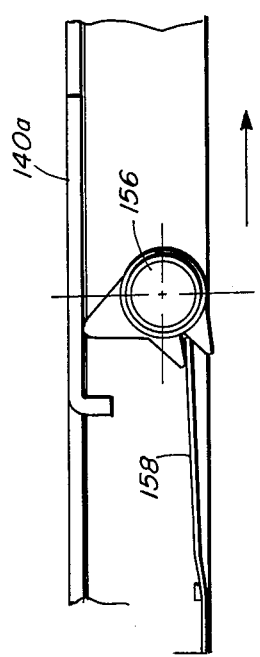

FILM ADVANCE MECHANISM

BACKGROUND

This invention relates to a film advance mechanism for cameras which use separate, card-like film units. Film of this type is presently used in cameras of the self-developing type and accordingly, for clarity of description, the invention is described with principal reference to such cameras.

More particularly, the invention provides a film advance mechanism for cameras that use a film assemblage in the form of a cassette which houses a stack of separate card-like film units. This type of film cassette is commercially available from Polaroid Corporation in Cambridge, Massachusetts, for use in cameras sold under the registered designations SX-70 and PRONTO!, and is described in U.S. Pat. No. 3,651,746 of E. H. Land entitled "Film Assemblage". The film units in the cassette, disclosed in U.S. Pat. No. 3,415,644 of E. H. Land for "Novel Photographic Products And Processes", are stacked with a foremost one available for photographic exposure through an exposure window.

The case of the film cassette has an exit slot in a forward end wall and a flange-bordered exposure window in an upper wall. An access slot in the upper flange extends forward for a short distance from the rear end wall. This slot provides access for a movable pick member to engage an exposed film unit and advance it out of the cassette through the exit slot.

Cameras suitable for use with film assemblages of this type are described in U.S. Pat. No. 3,753,392 of E. H. Land entitled "Film-Advancing Apparatus", and in U.S. Patent application Ser. No. 648,725 of Johnson et al filed Jan. 13, 1976 for "Shutter Latch Arrangement Releasable Through Shutter Blade Actuation And Resettable Through Film Advancement", and assigned to the assignee hereof. Each of these cameras has film advancing apparatus which indexes an exposed film unit out of the cassette and feeds it to processing elements, typically a pair of spread rollers. The apparatus includes the pick member which enters the above-mentioned access slot of the cassette and engages the rear edge of the foremost film unit. The pick member is driven, typically by a motor, along the length of the access slot to advance the film unit by a distance essentially equal to, but limited by, the slot length.

Each camera also includes a pair of rollers, at least one of which is driven, positioned to receive the leading edge of a film unit that has been advanced in the foregoing manner, i.e., by a distance equal to the length of the cassette access slot. The roller pair ruptures a pod of photoprocessing fluid in the film unit and spreads the fluid over an internal layer to initiate development of the latent image on the film unit. In this process, the rollers draw the film unit out of the cassette and discharge it from the camera. The spread rollers are spaced from the cassette by a short distance limited by the length of the cassette access slot. This constraint, which the length of the cassette slot imposes on the placement of the rollers, imposes constraints on other design features of the camera, including the overall arrangement of the camera elements, the arrangement and nature of the optical system, and the arrangement of internal mechanisms such as the mechanism which drives the rollers.

In view of the above discussion, it is a principal object of the invention to provide a camera mechanism for advancing separate, card-like and cassette-housed film units, and which provides a greater magnitude of film advance than heretofore available.

It is also an object of the invention to provide a film advance mechanism of the above character which can advance a card-like film unit from within a cassette having an access opening for pick-indexing of the foremost card unit, and which provides advance over a distance significantly greater than the length of that access opening.

A more particular object of the invention is to provide a film advance mechanism of the above character for a self-developing camera and which provides a relatively long span of film advance from within the film cassette to the processing-initiating spread rollers.

Another object of the invention is to provide a film advance mechanism of the above character which provides a greater magnitude of film advance by engagement with the back edge of a cassette-housed film unit than heretofore available.

It is a further object of the invention to provide a film advance mechanism having the foregoing features and which is relatively inexpensive to manufacture, which is compact, and which is highly reliable in operation so as to be essentially fool-proof.

Other objects of the invention will in part be obvious and will in part appear hereinafter.

GENERAL DESCRIPTION OF INVENTION

A camera for achieving these objects according to the invention has a housing which forms a compartment for receiving and positioning a film cassette for exposure of the foremost film unit. A film advance mechanism of the camera has a slide carriage movable relative to the housing along a direction parallel to the advance of an exposed film unit from the cassette. The slide carriage carries structure for engaging the exposed film unit within the cassette and advancing it through the exit slot of the cassette. Upon being driven by movement of the slide carriage, this structure moves the film unit far longer than the length of an access slot conventionally provided on the cassette.

In one preferred embodiment, the carriage-carried film-engaging structure includes a web that carries a pick arm. The carriage is retractable to a start position where the web disposes the arm in the cassette access slot to engage the back edge of the foremost stacked film unit. Forward movement of the carriage carries the web and the arm to index that film unit forward through the cassette exit slot. As the web reaches the marginal flange of the cassette which forms the end of the access slot, it guides the arm under the marginal flange. Continued forward movement of the carriage thereby moves the arm underneath and hence beyond the access slot, and consequently continues to "push" the film unit from the cassette.

Another preferred embodiment of the invention provides a push-pull film advancing movement. Initial movement of the slide carriage from the retracted position pushes the film unit forward by a pick arm engaged behind the marginal edge of the film unit in a manner analagous to the foregoing embodiment. The arm travels in the access slot and the carriage only moves forward by the length of that slot. However, prior to the end of this forward advance, a marginal frontal edge of the film unit engages a gripper device that advances upon reverse carriage movement. Accordingly, reverse movement of the slide carriage to the fully-retracted position advances the film unit by a further increment of essentially the same length as the cassette access slot and, similarly, of the first increment of forward movement.

With both embodiments, the invention achieves long advance of a film unit packaged in a cassette designed to accommodate only a short indexing of the foremost film unit. The long film advance, which in both embodiments feeds the unit to spread rollers which advance it further and initiate the photographic processing, makes it possible to configure a self-developing camera with the film cassette spaced relatively far from the spread rollers. The resultant flexibility in the camera design facilitates new camera configurations. Further, a film advance mechanism according to the invention operates with such ease and smoothness that it can readily be implemented for manual operation, rather than requiring a motor drive. The mechanisms in addition readily incorporate further elements to prevent inadvertent mishandling by the operator and thereby make the operation essentially jamproof. A particular operator malfunction which is precluded is incomplete cycling of the slide carriage, which could result in launching a second film unit out of the cassette before a prior one is fully advanced.

A film advance mechanism according to the invention can additionally cock the camera shutter. A link element interconnecting the film advance movement of the slide carriage to the camera shutter can provide this operation with the same carriage movement that advances the film.

The invention accordingly comprises the features of construction, combinations of elements, and arrangements of parts exemplified in the constructions hereinafter set forth, and the scope of the invention is indicated in the claims.

BRIEF DESCRIPTION OF DRAWINGS

For a fuller understanding of the nature and objects of the invention, reference should be had to the following detailed description, taken in connection with the accompanying drawings, in which:

FIGS. 5 and 6 are, respectively, top plan and side elevation views of the film advance mechanism of the camera of FIG. 1, as seen inside the camera housing;

FIG. 9 is a fragmentary perspective view of the film advance mechanism of the camera of FIG. 1 which shows the shutter-cocking operation;

FIGS. 11 and 12 are, respectively, top plan and side elevation views of the film advance mechanism of the camera of FIG. 10, as seen inside the camera housing;

FIGS. 11a and 11b are detailed views of other operational features;

DESCRIPTION OF ILLUSTRATED EMBODIMENTS

Figure 1:
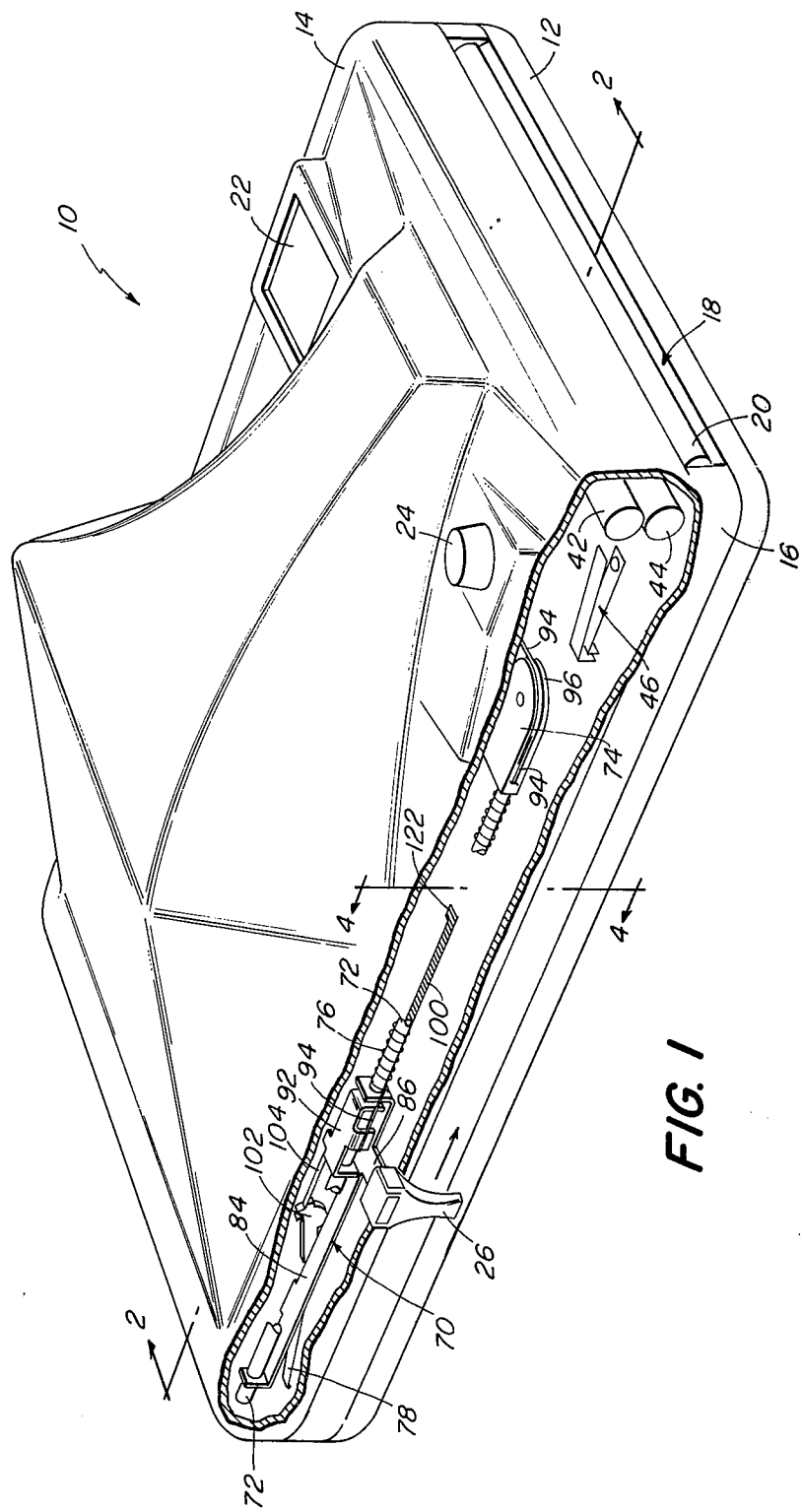
FIG. 1 is a perspective view, partly broken away, of a self-developing camera incorporating features of the invention.

FIG. 1 shows a camera 10 that has front and rear housing members 12 and 14 secured to a main frame 16. A film exit slot 18 is at the forward end of the camera (right side of FIG. 1). It is normally covered by a movable light shield 20 of known construction and operation. The rear housing member 14 supports an optical element 22 of a viewfinder system and supports a shutter release button 24. An actuator handle 26 of a film advance mechanism projects from within the camera for movement along the camera length, as designated with an arrow.

The general arrangement and major components of the optical system of camera 10 are described with reference to FIG. 2. This discussion is given only to facilitate an understanding of the structure, operation, and capabilities of the film advance mechanisms of the invention. Other aspects of the camera 10 are the subject of the following patent applications filed on even date herewith and assigned to the assignee hereof, and the disclosures of which are incorporated herein by reference:

| Inventor | Title |
|---|---|
| Lawrence M. Douglas | "Selective Closure of Camera Viewfinder and Camera Incorporating Same", U.S. Application No. 720,047 |
| Lawrence M. Douglas | "Compact Self-Developing Camera With Folded Optical Image Path", U.S. Application No. 720,054 |
| James G. Baker | "Prism Camera", U.S. Application No. 720,008 |
| Bruce K. Johnson | "Compact Prism Camera", U.S. Application No. 720,004 |
| Lawrence M. Douglas | "Camera With Movable Film Drive And Optical Unit, U.S. Application No. 720,006 |

Figure 2:
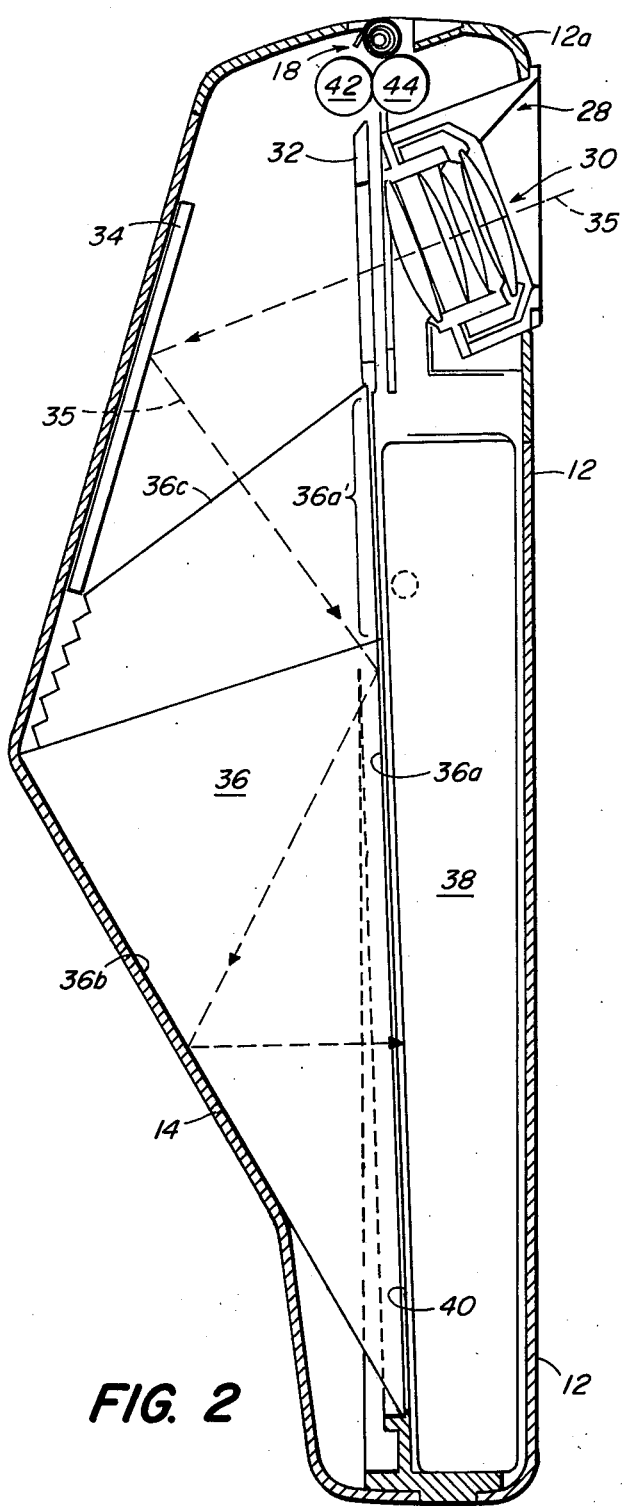
FIG. 2 is a simplified cross-sectional view of the camera of FIG. 1 taken along line 2—2.

Referring to FIG. 2, the camera taking lens 30 is mounted in an angled recess 28 in housing member 12. A shutter system 32 is in optical alignment along the optical path 35 between the taking lens 30 and a mirror 34. This mirror receives light from the taking lens 30 through the open shutter, and reflects it to the surface 36a of a prism 36. The relative orientations of the prism surface 36a and of the mirror 34 produce total internal reflection of this light from a major portion of the prism surface. A forward surface portion 36a' can be coated to facilitate reflection where total internal reflection does not occur. The light reflected from surface 36a is incident upon another prism surface 36b, which is reflective and redirects the light substantially perpendicularly toward the surface 36a. Because of the perpendicular incidence, the light exits from this prism surface and impinges upon the foremost film unit in a film cassette 38. The camera frame and housing dispose the cassette with this film unit at the camera image surface 40, which is closely adjacent and parallel to the prism surface 36a.

The camera 10 also has a pair of film-advancing and processing rollers 42, 44 disposed within the housing adjacent the camera exit slot 18 on the opposite side of taking lens 30 from the image surface.

The film advance mechanisms described below advance an exposed film unit from the image surface 40 to the nip between the press rollers. Typically, a motor and gear train (not shown) drive the roller 44, and the other roller 42 is an idler. The motor is powered from a battery contained in the film cassette, which is described below with reference to FIG. 3 and in greater detail in the above-noted U.S. Pat. No. 3,651,746. The electrical connection between the motor and the battery is made by a switch 46, FIG. 1, positioned to be closed by the leading edge of an advancing film unit just before that leading edge reaches the nip of rollers 42, 44.

Figure 3:
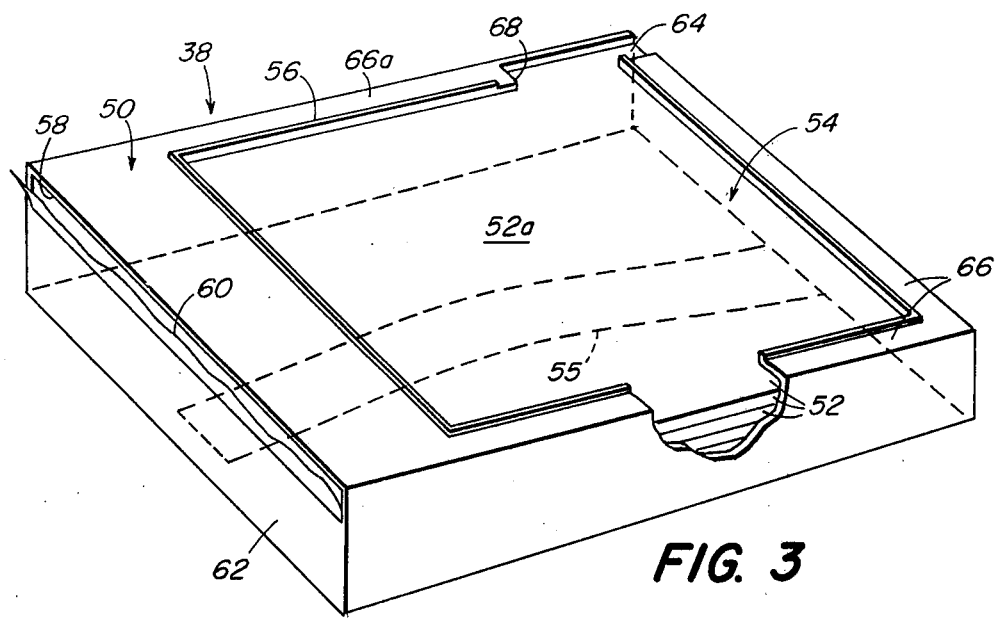
FIG. 3 is a perspective view of a film assemblage suitable for use in the camera of FIG. 1.
Figure 4:
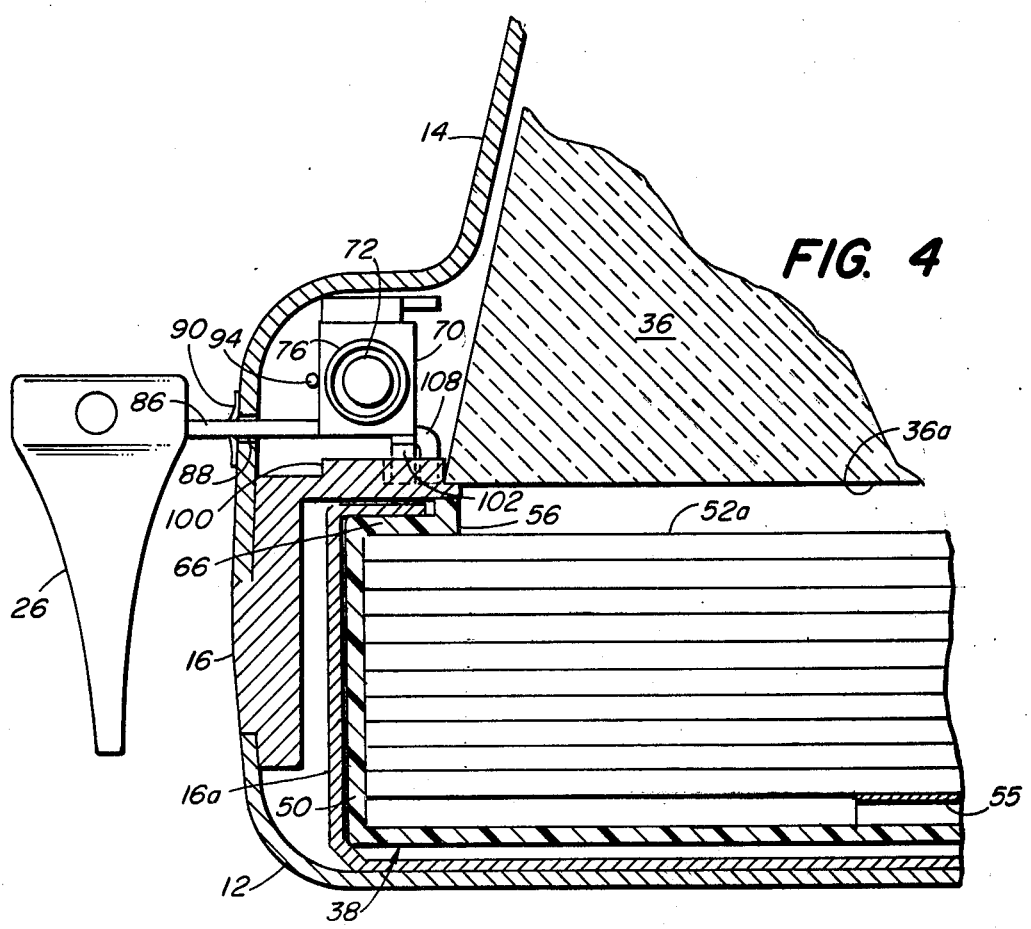
FIG. 4 is a fragmentary sectional view of the film advance mechanism of the camera in FIG. 1 taken along line 4—4.

Turning to FIG. 3, it shows a commercially available film cassette 38 with which the film advance mechanisms of the invention are particularly useful. As mentioned above, U.S. Pat. No. 3,651,746 contains a more detailed description. The cassette 38 has a casing 50 containing a stack of several thin, flexible individual film units 52 of the self-developing type. The casing is open at its top wall to form an exposure window 54 bounded by a peripheral flange 66. A leaf spring 55 in the casing biases the film units toward the casing top wall so that the foremost film unit 52a is at the exposure window. When the cassette is within the camera 10, as FIG. 4 shows, the flange 66 and an upstanding peripheral lip 56 around the cassette exposure window 54 engage the main frame 16 and a frame portion 16a to ensure accurate positioning of the exposure window and foremost film unit 52a within the camera.

The cassette 38 has an exit slot 58, through which the foremost film unit can slide but which is normally shielded by a pliable flap 60, in a front wall 62. Extending forward from the back wall along one side of the cassette is an access slot 64 which communicates with the exposure window 54. That slot 64 interrupts the lip 56 and recesses the flange portion 66a which extends along the casing side from the rear wall. The slot 64 has a fixed length between its forward end 68 and the rear face of the cassette. In an illustrative example, this length is about twenty-two centimeters, of which about sixteen centimeters extend along the exposure window 54.

As the above-noted U.S. Pat. No. 3,753,392 discloses, the slot 64 provides access for a film-advancing pick arm to engage the back marginal edge of the foremost film unit within the cassette 38, to advance it through the exit slot 58. The extent of such film advance with conventional film advancing structures is limited to the fixed length of the slot 64. This limitation has limited the location of the processing rollers and has thereby been a constraint on overall camera design. The film advance mechanisms of the present invention, on the other hand, achieve a film advance which is far greater than the fixed length of the slot 64, and thereby facilitate improvements in camera design. The invention provides this advantage while preserving the highly desirable use of the presently-available film cassette having the short access slot 64.

The first embodiment of such a film advance mechanism, shown in FIGS. 1 and 4-7, has a slide carriage 70 supported for sliding motion on a rod 72. As FIGS. 1, 5, and 6 show, the rod is mounted at one end to the frame 16 and a frame-carried block 74 at the other end, and extends adjacent the exposure window 54 of a film cassette 38 received in the camera. A spring 76 is disposed around the rod 72 compressed between the carriage 70 and the block 74 to bias the carriage in a reverse direction, i.e., away from the camera exit slot 18 and to the left in FIGS. 1 and 5. A resilient pick arm 78, typically of spring metal and having a downwardly-turned film-engaging hoe-like end 78a, is secured to a rear portion of the slide carriage 70 by a connecting web 82. As can be seen in FIGS. 5 and 6, the carriage 70 can travel along the rod 72 to move the arm end 78a from beyond the rear wall of a film cassette 38 housed in the camera to a forward position where the web 82 engages the front edge of the cassette exposure window 54. The length of this carriage travel typically exceeds three quarters or so of the length of the exposure window.

Figure 7:
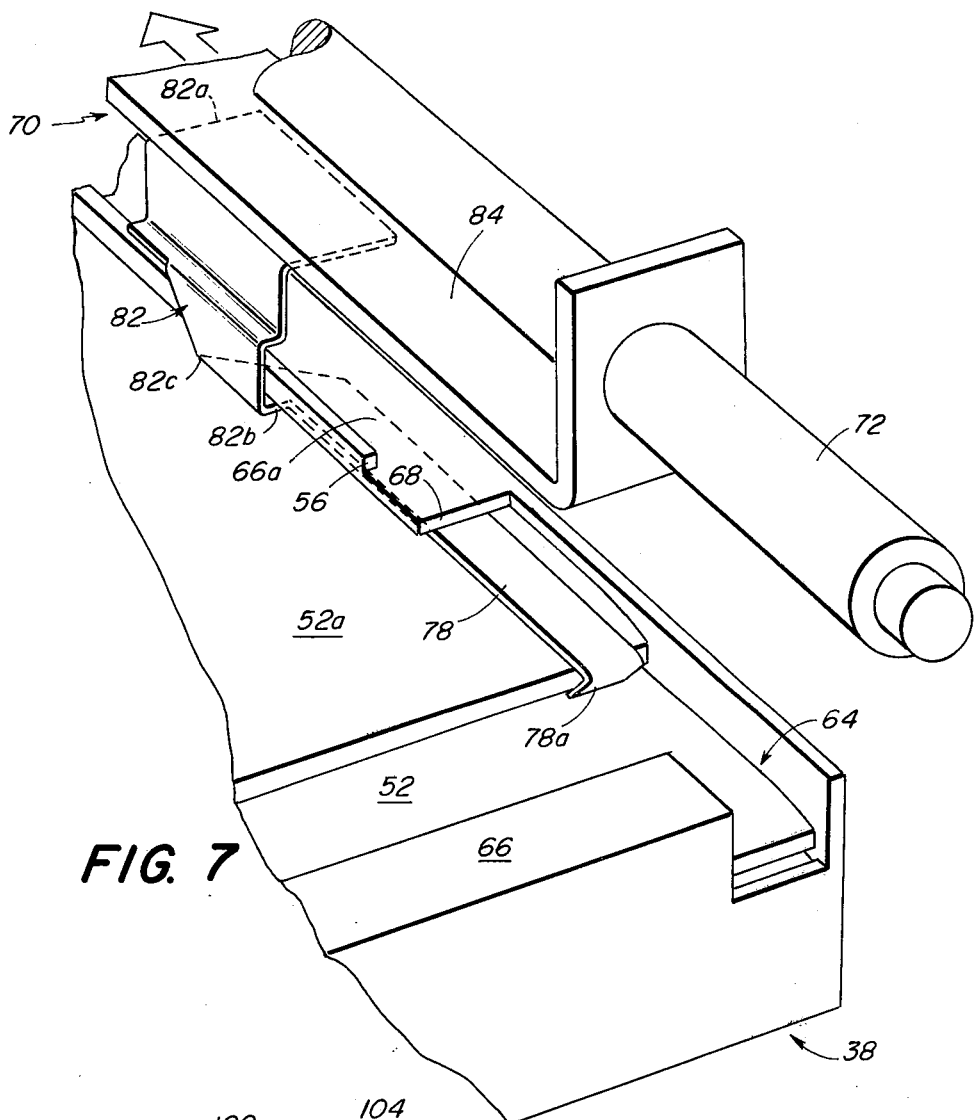
FIG. 7 is a fragmentary simplified perspective view illustrating operation of the film advance mechanism of the camera of FIG. 1.

As shown in FIG. 7, the web 82 has a substantially U-shaped cross section in the plane transverse to rod 72. An upper leg 82a of the U-shape is secured to the slide carriage 70, a lower leg 82b is integral with the arm 78, and the intermediate leg 82c is disposed substantially parallel with, and adjacent to, the cassette lip 56 which defines one longitudinal side of the cassette exposure window 54. When the carriage is in the retracted, reverse position, the web is directly over the access slot 64 of a film cassette, and is fully disengaged from the cassette. However, when the carriage moves the web forward, e.g. to the position shown in FIG. 7, the web lower leg 82b rides under the cassette flange 66a, drawing the arm 78 with it. As explained further below, it is this interfitting of the web with the film cassette that provides a long film-unit advance.

With reference to FIGS. 1 and 4, the overall slide carriage 70 is constructed with an elongated guide frame 84 that extends along the rod 72. It has upstanding front and rear tabs apertured to seat on the rod and thereby slidingly mount the carriage on the rod. The frame 84 mounts the arm-carrying web 82, and a carriage arm 86 laterally projects from the guide frame. This arm passes through an elongated opening 88 in the housing 14. The handle 26 is hingedly secured to the free end of arm 86 outside the camera housing for moving the frame 84, and hence the overall carriage 70, along the rod 72. Conventional light masks, illustrated as resiliently flexible opaque flaps 90, shield light from entering the opening 88.

As best seen in FIGS. 1, 5, and 6, the illustrated carriage guide frame 84 carries a shutter-cocking bracket 92, which as illustrated also has a pair of apertured tabs which slidingly seat on the rod 72. One end of a flexible shutter-cocking cable 94 is secured to the bracket. From the bracket, the cable successively extends alongside the rod 72, is trained about a pulley 96 rotatably supported on the block 74, and extends transverse to the rod to a moveable shutter cocking member 98.

To prevent improper reverse movement of the slide carriage, the camera frame 16 mounts a ratchet 100 extending along the travel of the slide carriage, and the carriage carries a ratchet-engaging pawl 102 biased by a leaf spring 104. The pawl is mounted on a guide frame panel 84a (FIG. 8A) for rotation about an axis 106 transverse to the slide rod 72.

Figure 8A:
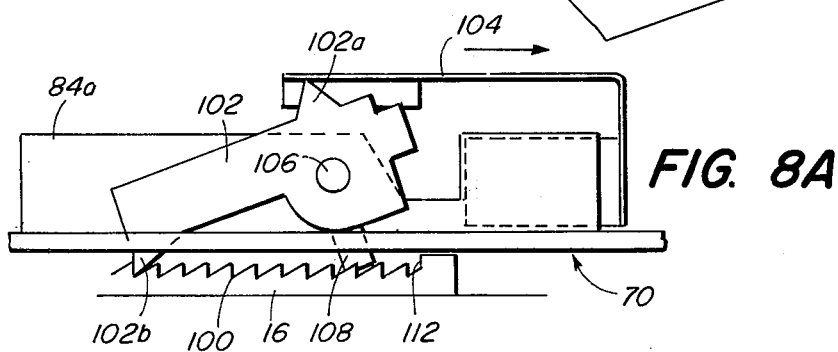
FIGS. 8A and 8B are side elevation views illustrating other operational features.
Figure 8B:
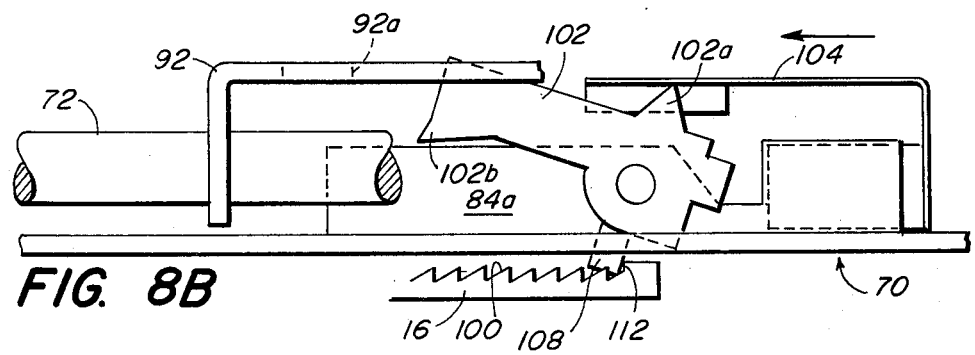

As shown in the detailed views of FIGS. 8A and 8B, the spring 104 is of the over-center type and engages either side of a lobe 102a on the pawl to bias the pawl to one of two rotational positions. One is a ratchet-engaging position shown in FIG. 8A, where the pawl is rotationally oriented to dispose a projection 102b into engagement with the ratchet 100. The engaged pawl and ratchet permit only forward motion of the pawl (left to right motion in FIGS. 8A and 8B), and thus of the slide carriage 70. In the other position, FIG. 8B, the pawl is rotated clockwise to disengage the projection from the ratchet. This frees the carriage 70 for reverse movement along the slide rod 72.

To shift the pawl between these positions, it has a cam follower 108, FIGS. 6 and 8, extending generally toward the ratchet 100 but laterally offset from it as shown in FIGS. 3 and 5. Arranged to engage the cam follower at the ends of the carriage travel are a rear cam 110 and a forward cam 112, both carried on the camera frame, as FIG. 6 shows. The illustrated cams are located at the ends of the ratchet 100, and are laterally offset from it to be aligned with the pawl cam follower 108. With this positioning, as the pawl 108 approaches either end of the ratchet 100, the follower 108 engages one of the cams 110, 112, to rotationally shift the pawl to its other stable position.

This action can best be understood by further reference to FIGS. 8A and 8B. In FIG. 8A, the slide carriage 70 is moving forward, to the right, with the pawl projection 102b in engagement with the ratchet 100. The resilient pressure of the spring detent 104a against the lobe 102a maintains the pawl in this position. The engagement of the pawl with the ratchet prevents reverse, leftward, movement of the pawl and hence of the carriage 70, while allowing continued forward movement. When the pawl reaches the extreme forward limit of travel along the ratchet, the engagement of the cam follower 108 with the forward cam 112 rotationally flips the pawl clockwise to the position shown in FIG. 8B. This rotation carries the lobe 102a past the spring detent, which flexes the spring backward, until the spring detent resiliently bears against the other side of the lobe. The spring then holds the pawl in the position of FIG. 8B. In this position the pawl projection 102b is raised upward, removed from the ratchet 100. Consequently the pawl and, similarly the carriage, are free for reverse, leftward movement along the slide rod 72. Upon reaching the limit of this reverse movement, an analogous engagement of the cam follower 108 with the reverse cam 110 rotationally flips the pawl counterclockwise, back to the ratchet-engaging position of FIG. 8A.

With the above structural relationships in mind, the general operation of the camera 10 as well as the more particular operation of the film advance mechanism will now be described. With a film cassette 38 (FIG. 3) seated in the camera (access can be provided by a hinged portion of the camera housing), the foremost film unit 52a is at the image surface 40 and hence positioned parallel to and closely adjacent the prism surface 36a. Manual depression of the shutter release 24 operates the shutter 32 to permit a momentary passage of light along the optical path 35 from the taking lens 30 to the mirror 34, and into the prism 36 for multiple reflections before finally exiting perpendicular to the surface 36a for exposure of the foremost film unit 52a.

Prior to the film exposure, the slide carriage has been moved to its rearmost position, FIG. 1. Here, as FIGS. 5 and 6 show, the pick arm 78 and its arm-mounting web 82 are disposed over the cassette access slot 64. The hoe-like end of the arm is engaged behind the back margin of the film unit 52a.

After exposure, the camera operator manually engages the film advance handle 26 and moves it forward against the force of the biasing spring 76. As the resultant forward sliding movement of the carriage draws the arm 78 forward, the end of the arm pushes the film unit ahead of it, so that the frontal edge passes out of the cassette through the cassette slot 58 (FIG. 3). However, rather than have the arm travel above the marginal flange of the film cassette as in the prior art where the slot edge 68 limits film advance, the web 82 depresses the pick arm 78 below the cassette flange 66a, as FIG. 7 shows. The arm, and the carriage which carries it, can accordingly advance a film unit by a distance essentially equal to the length of the exposure window 54 of the film cassette.

For this operation, the web is positioned to dispose its lower leg 82b below the cassette flange. The structure which provides this relative positioning is the camera frame 16, which positions the film cassette; and the slide rod 72 and carriage 70, which position the web. Further, the biasing spring of the cassette, which urges the stack of film units therein against the upper casing wall, accommodates whatever slight displacement the web 82 and the arm 78 exert on the foremost film unit. Also, the web leg 82c is positioned so closely adjacent the window-bordering rim 56 of the cassette to ensure that it does not interfere with the exposure of the photosensitive portions of the film.

When the foremost film unit 52a has been driven in this manner for a distance almost equal to the full stroke of the slide carriage 70, its front edge engages and closes the switch 46 (FIG. 1). The circuits (not shown) connected with the switch cause the roller-driving motor to start just at the leading edge of film unit reaches the nip of the rollers 42, 44. Thus, as soon as the forward motion of the slide carriage 70 carries the film unit to the spread rollers, the rollers engage the film unit and continue to advance it, in the conventional manner. The film advancing carriage has now reached the foremost end of its travel and can be returned to its rearward starting position, ready to engage and advance another film unit. The motor-driven rollers continue to advance the preceding film unit until the trailing edge of that film unit passes the swithc 46, which allows the switch to open, turning the motor off. By the time the motor stops, however, the film unit has been drivingly discharged from the camera through the exit slot 18.

During the foregoing forward motion of the slide carriage, enagement of the pawl 102 with the ratchet 100 prevents reverse movement of the carriage until after it has reached its extreme forward position. Such reverse movement, whether by accident or intentional effort, could "strand" the film unit 52a in an intermediate location in the camera. Continued retraction and subsequent forward movement of the carriage could result in two film units being driven forward in the camera simultaneously, and this could result in jamming of the film units in the cassette exit slot or in the rollers 42, 44. It is this type of malfunction which the ratchet and pawl prevent. After a full forward stroke of the slide carriage 70, the pawl is switched by the forward cam 112 to the disengaged position and thereby permits reverse movement of the carriage. After the carriage has been fully returned to its original rearmost position, the rear cam 110 returns the pawl to its ratchet-engaging position, ready for the next film-advancing forward stroke.

In addition to the foregoing operation, the return movement of the slide carriage 70 recocks the shutter of the camera 10 by moving the bracket 92 rearward from its normal position shown in FIGS. 5 and 6 to the retracted position shown in phantom in FIG. 9. The bracket is slidingly seated on the slide rod 70 and carries one end of the flexible cable 94 that extends to the shutter cocking member 98. A spring 114, one end of which is grounded to the camera frame, biases the member 98, and thereby the bracket 92, to the positions shown in solid in FIG. 5. In this position, the bracket abuts a stop illustrated as a collar 116 affixed on the slide rod 72, to limit the spring-urged forward motion of the bracket. The collar also limits the reverse motion of the carriage 70 by abuttingly engaging the forward tab of the guide frame 84. Thus the carriage frame 84 and the cocking bracket 92 normally are in the positions which FIGS. 5 and 6 show.

Forward motion of the carriage 70 from this position, which it undergoes to advance a film unit as described above, moves the carriage forward relative to the bracket 92, which the stop collar 116 prevents from forward movement. The film advancin motion of the carriage 70 thereby moves the pawl 102 to a position forward of the bracket 92, as FIG. 9 shows in solid. When the carriage 70 begins to move back, at the end of its film advancing movement, the pawl is raised as shown in FIGS. 8B and 9. In this position, the pawl engages a laterally-projecting tab 92a on the bracket 92. Accordingly, the reverse motion of the carriage draws the bracket 92 backward with it, and thereby draws the film-cocking member 98 from the position shown in FIG. 5 with solid lines to the shutter-cocking position shown with broken lines.

The above-noted, commonly-assigned and concurrently-filed application entitled "Selective Closure Of Camera Viewfinder And Camera Incorporating Same" describes that this motion of the shutter cocking member 98 draws shutter blades to a cocked position, where a latch mechanism, not shown, positively engages them until the shutter is operated. Accordingly, the function of the shutter cocking member 98 is to draw the shutter blades with it between the positions shown in FIG. 5. This movement of the member 98 stops when the slide carriage 70 reaches its fully retracted position, where the pawl 102 is cammed from its raised, ratched-disengaged position of FIG. 8B to its lowered, ratchet-engaging position of FIG. 8A. This shifting of the pawl 102 releases it from engagement with the bracket tab 92a, as FIG. 9 shows in phantom. The released bracket then returns to its normal position, FIGS. 5 and 6, due to the pull of the spring 114, which is increasingly tensioned during the preceding, reverse movement of the cocking bracket 92. The spring 114 thus returns the bracket 92 to the FIG. 5 position, and returns the member 98 to the position shown in solid in FIG. 5. Here the member 98 is out of engagement with the shutter blades, and hence does not interfere with film-exposing operation of the shutter. After the shutter opens and closes, the shutter blades are again in abutting engagement with the member 98, from where the foregoing shutter-cocking movement returns the blades to their cocked position.

FIGS. 10 through 15 show another film advance mechanism for achieving a magnitude of film advance greater than the length of the access slot 64 in the film cassette 38 (FIG. 3). Like the foregoing embodiment, this mechanism engages the film unit and advances it by a major distance with a single forward and return stroke of a slide carriage. However, this mechanism first "pushes" the film unit with a pick arm, and then "pulls" it by a grabber that moves forward during the return travel of the slide carriage. (Elements of the FIG. 1 camera 10 which are common to FIGS. 10-15 are designated with the same reference numerals plus a prime. Thus, by way of example, the FIG. 10 camera 10' has housing members 12' and 14'. The illustrated camera 10' uses a film cassette such as that shown in FIG. 3, and elements of the cassette 38 bear the same reference numerals in FIGS. 10 through 15 as in FIG. 3.)

Figure 10:
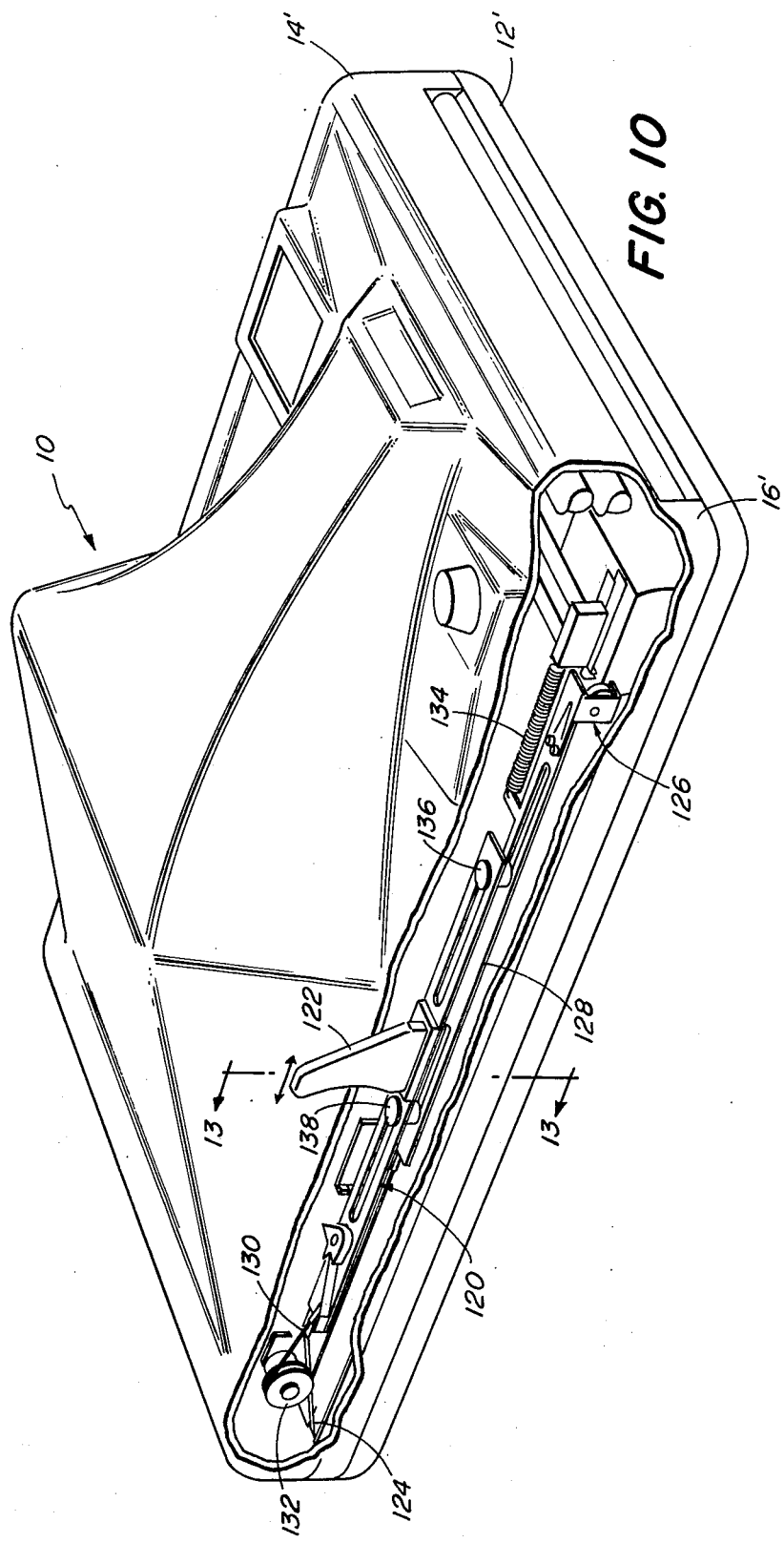
FIG. 10 is a perspective view, partly broken away, of a self-developing camera incorporating another embodiment of the invention.

The illustrated push-pull advance mechanism has, as FIG. 10 shows, a slide carriage 120 driven back and forth along the direction of the arrow by manual engagement of an upstanding handle 122. The carriage carries a pick arm 124 that drivingly engages, through the cassette slot, the back edge of the foremost film unit in a cassette, as conventional. Forward movement of the carriage 120 thus indexes the film unit forward to project the front edge out of the cassette. To move the film unit further, the advance mechanism has a releasable film grabber 126 disposed to engage a margin of the film unit projecting forward from the cassette, and to draw the film unit forward to the press rollers of the camera. The grabber is mounted on a slide platform 128 that is coupled to move with, but in the opposite direction from, the slide carriage. For this purpose, the carriage and the platform are interconnected by a flexible cable 130 which is trained around a pulley 132. In addition, a coil spring 134, connected between the slide platform 128 and the camera frame 16, biases the interconnected slide elements to a normal position where the carriage 120 is at its full reverse position ready to engage a newly-exposed film unit, and the gripper 126 is at its extreme frontal position. The illustrated construction further employs frame mounted-guide pins 136 and 138 seated in slots in the carriage 120 and in the slide platform 128 to guide the travel of these elements along the direction of the arrow.

More particularly, as detailed in FIGS. 11 through 14, the slide carriage 120 and the slide platform 128 are supported in spaced relation one above the other above a frame-mounted bracket 140 by the pair of guide pins 136 and 138, which are mounted on the plate 140. The pins project through slots 142, 142 in a support plate 144 of carriage 120, and through slots 146, 146 in the platform 128. A spacing collar 148 is seated on each pin 136, 138 intermediate the platform 128 and the bracket 140 to space them apart and to facilitate sliding movement of the carriage relative to the platform. The lengths of the slots 142 and 144 are equal and define the magnitude of permitted sliding movement of the carriage 120 and of the slide platform 128. As will become apparent, this length is substantially equal to the fixed length of the slot 64 of the film cassette 38 (FIG. 3).

Figure 13:
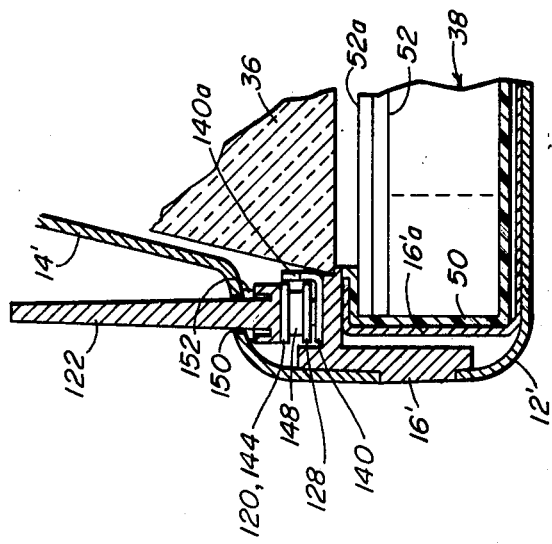
FIG. 13 is a fragmentary sectional view of the film advance mechanism of the camera in FIG. 10 taken along line 12—12.

The carriage plate 144 carries, at its back end, the resilient pick arm 124, which has a hoe-like film-driving tab 124a at the remote end. The plate 144 also mounts the upwardly-projecting actuating handle 122, which projects through a slot 150 in the camera housing 14', as shown in FIGS. 12 and 13. Attached to the handle 122 are front and back flexible light shields 152, 152 arranged to block light from entering the camera through the slot 150. The actuator handle 22 is fastened to the plate-like frame 144 by screws or like fasteners with a leaf-type spring member 154 nested therebetween. The spring member biases the tab-like light shields 152, 152 to engage the inside surface of the housing 14' to ensure secure masking of the housing slot 150.

The flexible cable 130 which interconnects the slide carriage 120 and the slide platform 128 is connected between the back end of plate 144 and the back end of the slide platform 128. The pulley 132 about which the cable 130 is trained is mounted on the housing bracket 140, for rotation about an axis perpendicular to the sliding movement of the carriage 120, i.e. perpendicular to the common axis of slots 142 and 146.

Figure 14:
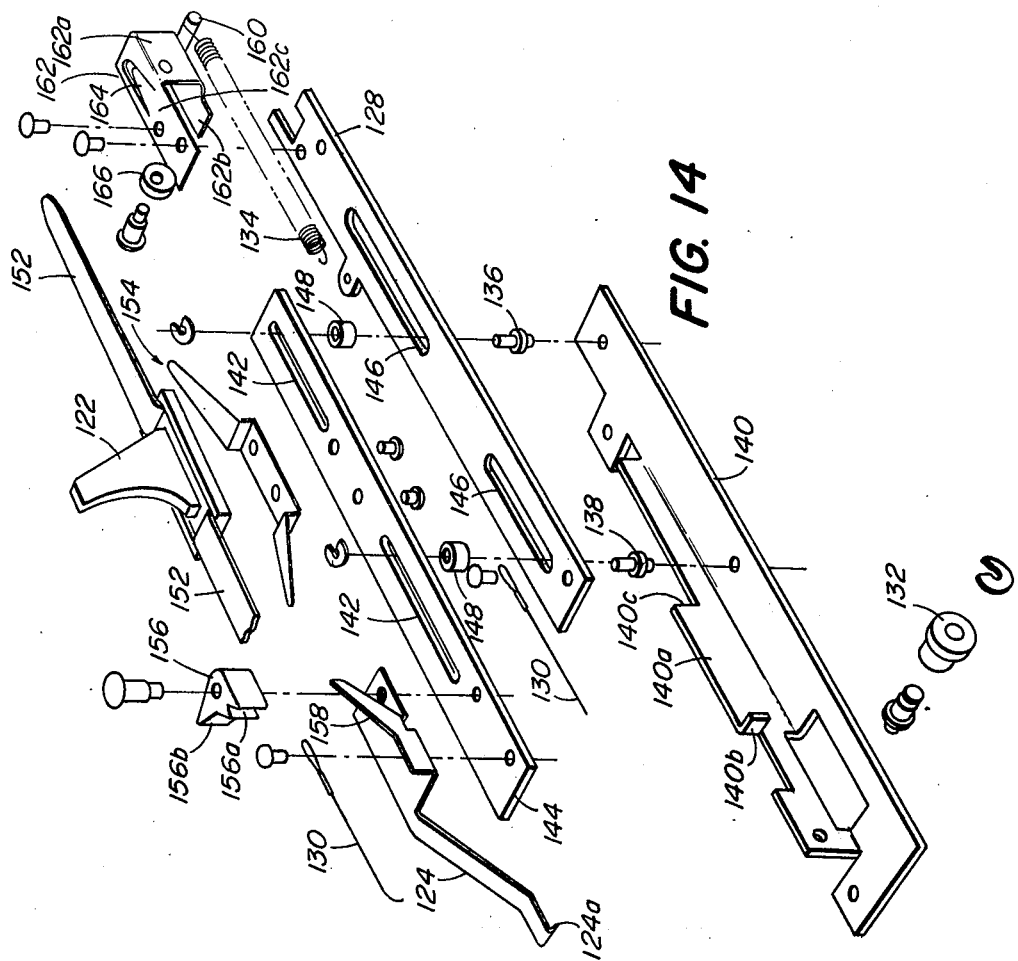
FIG. 14 is an exploded view of the film advance mechanism of the camera of FIG. 10.

The slide carriage 120 mounts a pawl 156 which restricts the carriage to undergo only forward movement during the initial portion of the film advancing operation, and only reverse movement during the second portion. The pawl 156 is rotatably mounted on the plate 144 and is biasingly engaged by a leaf spring 158 to have a stable position as shown in FIGS. 11 and 14. With the illustrated construction, the pawl rotates about an axis perpendicular to both the direction of movement of the slide carriage 120 and the rotation axis of the pulley 132, i.e. a vertical axis in FIG. 14. The leaf spring 158, which can be made integral with the pick arm 124 from a single piece of spring material as FIG. 14 shows, projects its free end into a biasing notch 156a on the pawl. The pawl also has a laterally-extending, tapered projection 156b.

During travel of the carriage 120, the pawl projection engages an upstanding wall portion 140a extending on the framemounted bracket 140 along the direction of the carriage travel. The wall portion has a transversely-projecting tab 140b at the back end thereof and an edge 140c at the forward end; the tab and the edge define the length of the wall portion 140a which the pawl 156 engages during movement of the slide carriage.

FIG. 12 shows that the slide platform 128 locates the gripper 126 at its forward end to be closely adjacent the nip of the camera spread rollers 42', 44' when the platform is in its normal forward position. Further, the sliding travel of the platform moves the gripper along a path that overlaps the path along which a lateral edge of the advancing film unit follows in approaching the spread rollers 42', 44'. With further reference to FIGS. 11, 12 and 14, the illustrated film gripper has a cage 162 secured to the platform. The cage includes an upstanding wall 162a, lying in the plane of FIG. 12, and a bottom wall 162b which lies in the plane of FIG. 11. The cage upper wall 162c, by which the cage is mounted to the slide platform 128, forms a leaf spring 164 which deflects into the space between the top and bottom cage walls. An eccentric wheel 166 is rotationally mounted within the cage from the sidewall 162a and is positioned to have its periphery engagingly bear against the lower wall 162b, as shown in FIG. 12. The axis of rotation of the wheel 166 is located rearward and above (in FIG. 11) the actual center of the circular periphery of the wheel. The leaf spring 164 resiliently bears against the upper peripheral edge of the wheel 166 to rotationally bias it into contact with the cage wall 162b.

Figure 15A:
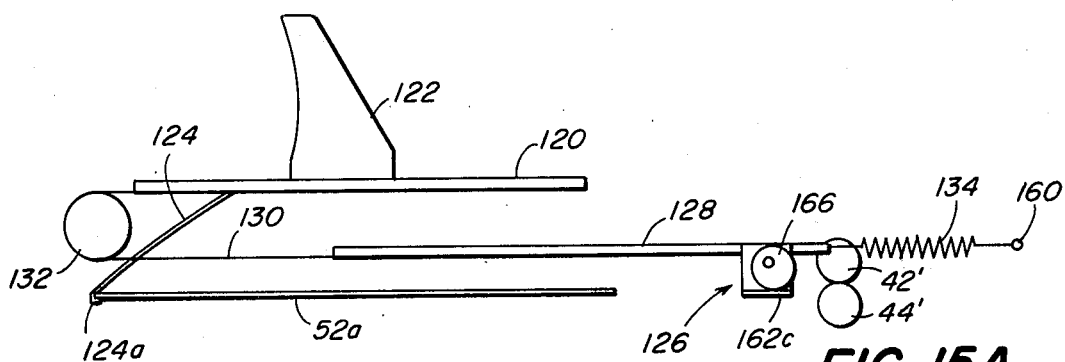
FIGS. 15A, 15B and 15C are simplified schematic illustrations showing the operation of the film advance mechanism in the camera of FIG. 10.

The operation of the flim advance mechanism in FIGS. 10 through 14 will now be described with reference to the schematic illustrations of FIGS. 15A through 15C. FIG. 15A shows the relative positions of the slide carriage 120, the slide platform 128, and the foremost film unit 52a of a film cassette 38 received in the camera 10' when the film advance handle 122 is retracted. The slide carriage 120 is in its normal rearmost position and the film engaging end 124a of the pick arm projects through the cassette access slot 64 (FIG. 3) to engage the rear edge of the film unit 52a. In this position, the camera 10', which is of the type described above with reference to FIGS. 1 and 2, can expose the film unit 52a for taking a picture.

After exposure, the film unit 52a is to be advanced out of the cassette 38 to the nip between rollers 42', 44'. To commence this film advancing operation, the operator moves the actuator handle 122 forward, i.e. to the right in FIGS. 15A. This motion advances the slide carriage 120 in the same direction, causing the pick arm to draw the film unit 52a forward, as ilustrated in FIG. 15B. The magnitude of this initial increment of advancing movement is indicated as "A" in FIG. 15B and is limited by the length of the cassette access slot.

As discussed above in connection with the prior embodiment, the film unit must be advanced more than this slot length to reach the remotely-located spread rollers 42', 44', and this further advance is provided as follows. As the slide carriage 120 moved forward from the position of FIG. 15A to that of FIG. 15B, the linkage provided by the cable 130 moved the slide platform 128 rearward by the same distance "A". Accordingly, during the first increment of film advance, the simultaneous forward advance of the film unit 52a, and the retraction of the film gripper 126 on the slide platform 128, introduce the front edge of the film unit 52a into the gripper 126, i.e. interpose the film unit between the eccentric wheel 166 and the cage bottom wall 162c. This occurs as the slide carriage 128 approaches its extreme forward position of FIG. 15B.

The eccentric mounting of the gripper wheel 166 within the cage 162 permits the film unit 52a to move forward relative to the film gripper 126 with essentially no restriction, but prevents it from being drawn rearward relative to the gripper. Such reverse motion only increasingly clamps the film unit between the eccentrically mounted wheel and the cage bottom wall 162c. The gripper spring 164 biases the wheel to continuously engage the film unit and press it against the bottom wall of the gripper cage. It should be apparent that the gripper wheel 166 functions as a pivoted and spring-biased pawl and accordingly can, like other illustrated elements, have other forms.

Figure 15B:
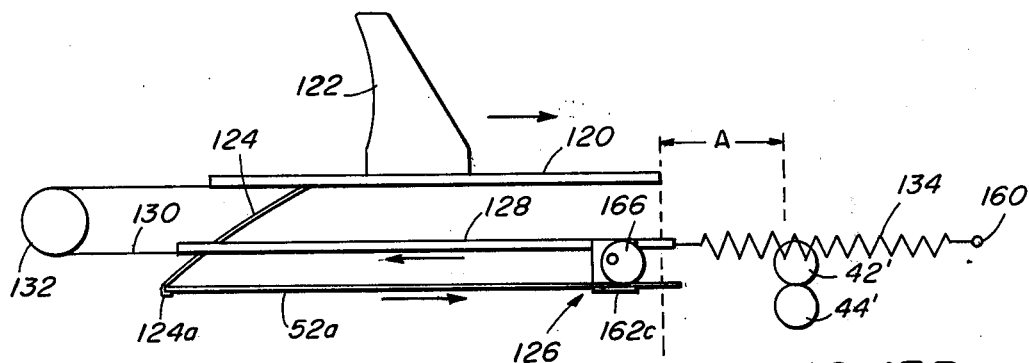
Figure 15C:
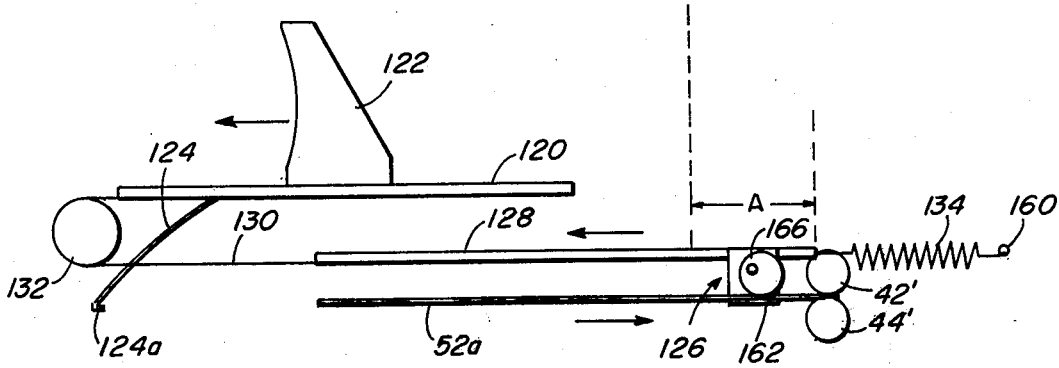

When the operator next moves the actuator handle 122 rearward, from the extreme forward position of FIG. 15B, the slide carriage 120 is drawn rearward but the slide platform 128 moves forward, under the influence of the spring 134. This forward motion of the slide platform 128 carries the film gripper with it and accordingly advances the film unit 52a by a second increment from the position shown in the FIG. 15B to the position shown in FIG. 15C. At the completion of this advance, which is of the same length "A" as the first increment, the film unit leading edge has already actuated the motor drive for the spread rollers (as described above with reference to FIGS. 1 and 2) and is introduced into the nip of the rollers 42', 44'. The motor-driven rollers accordingly pull the film unit further forward, a motion which the gripper freely allows. Thus, the film advance mechanism shown advances the foremost film unit to the remote location of the rollers 42', 44' despite the limitations imposed by the short length of the access slot of the film cassette.

As discussed above in connection with the camera of FIG. 1, reverse movement of the slide carriage 120 before it has advanced to its extreme forward position is undesirable. Similarly, during the second increment of film unit advance, reverse motion of the platform-carried gripper 126 is undesirable until the film unit is delivered to the spread rollers. The engagement of the pawl 156 with the wall portion 140a ensures both desired states of unidirectional movement with the embodiment of FIGS. 10 through 14, as will now be described with reference to FIGS. 11 and 12 and the detailed views of FIGS. 11A and 11B. The biasing spring 168 engages the pawl notch 156a to bias the pawl to a neutral position (FIG. 11) in which its tapered projection 156b is directed essentially perpendicular to the direction of sliding motion of the slide carriage 120.

When the slide carriage 120 advances forward from the position shown in FIG. 11, the pawl 156 rotatingly deflects counterclockwise to allow the projection 156b to pass the tab 140b. Once forward of the tab 140b, the projection 156b engages the wall portion 140a, which rotationally orients the pawl such that the projection is pointed slightly in a rearward direction, as FIG. 11A shows. The spring 158 exerts a biasing force that tends to return the pawl to its normal position, and hence holds the projection 156a firmly against the wall portion. This orientation of the pawl projection relative to the wall portion allows free forward motion of the pawl and accordingly of the slide carriage, but interferingly jams the pawl projection against the wall portion in the event of reverse movement. Accordingly, when in the position shown in FIG. 11A, which the pawl assumes during forward movement of the carriage 120, the pawl and wall portion prevent reverse motion of the slide carriage.

The length along the direction of film advance of the wall portion 140a is such that just before the slide carriage 120 reaches the extreme forward position (FIG. 15B), the pawl projection 156b passes the forward edge 140c of the wall portion. The pawl is not free to resume the normal perpendicular orientation under the influence of the biasing spring 158. However, during retraction of the slide carriage 120 back to the location of FIGS. 15A and 15C, the pawl projection again slidingly engages the wall portion 140a, but not with a resultant clockwise rotation of the pawl, to the position shown in FIG. 11B. Here the pawl slides freely along the wall portion in the reverse direction, but it interferingly jams against the wall portion in the event of forward motion. The mechanism thereby now permits free reverse movement but prevents forward movement. This assures that the film unit 52a will receive a full second increment of movement by the film gripper 126, in order to advance to the nip of the spread rollers and be driven from the camera before the pick arm 124 is returned to its retracted position for engaging another film unit.

FIG. 11 also shows that the slide carrige 120 can carry a slotted cam arm 168 that rotates a follower arm 170, by way of an interconnecting pin 172, to cock the camera shutter. The follower arm has, at one end, a pivotal mounting 170a to the camera frame. The other end is pivotally connected to the shutter cocking member 98' of the camera; this connection includes a short slot 170c to accommodate relative motion of the arm 170 transverse to the travel of the cocking member 98' as the arm 170 rotates about its pivotal mounting. The slot 168a in the cam arm 168 extends longitudinal to the carriage slots 142, 146, but progressively departs laterally from the axis of these slots. Thus, the back end of the cam slot is the point of that slot closest to the axis of the slots 142, 146, and the slot forward end is the furthest point along that slot from this axis. The cam slot 168 is further arranged such that the pin 172, carried on the follower arm, is at the forward slot end when the carriage 120 is in the retracted, return position of FIG. 11. In this position, the cam slot rotationally positions the follower arm 170 as shown. This is the extreme counterclockwise rotational position of the arm 170 and positions the shutter cocking member 98' at the maximal distance from the axis of the slide slots 142, 146.

With further reference to FIG. 11, as the slide carriage 120 moves forward, the cam arm 168 moves forward with it and cams the follower arm 170 clockwise, as designated with the arrow 174. This movement draws the follower arm end 170b, and the cocking member 98', to the positions shown with broken lines in FIG. 11. As described above with reference to FIGS. 5 and 9, this movement can cock the shutter blades. Once cocked, other elements (not shown) positively engage the shutter blades and hold them in the cocked position. Thereafter, when the slide carriage 120 is retracted back to the return position of FIG. 11, the follower arm 170 is again rotated counterclockwise to the position shown, and this movement returns the cocking member 98' to the position where it is out of the way of the shutter blades, for unimpeded shutter exposure operation.

The invention thus provides a film advance mechanism for advancing separate card-like self-developing film units within a so-called "instant" camera. The mechanism has at least one slide carriage which rides on a frame-mounted rail element or other slide guide. The slide carriage carries an arm member which enters an access slot of the film cassette to engage the one film unit, and advance that unit at least partially out of the cassette upon advancing movement of the slide carriage. The film advance mechanism continues to engage the exposed film unit, in a manner other than through the cassette access slot, for further advancing that film unit out of the cassette by a total advance significantly greater than the corresponding length of the access opening.

In one embodiment, the further engagement is provided by the same arm member, but it is mounted on a web element which enters the cassette interior by way of the exposure window, and thereby sidesteps the constraint imposed by the limited length of the access slot. The slide carriage accordingly can travel for a distance essentially unrelated to the access slot. In another embodiment, the further engagement of the advance mechanism with the film unit is by way of a releasable gripper which engages the partially-advanced film unit outside the cassette. The gripper preferably moves in the direction opposite that of the slide mechanism. Accordingly, the latter embodiment operates to advance the film unit during both portions of a push-pull movement. The carriage movement in each direction is essentially equal to the access slot length and produces a film advance of essentially twice this travel.

The film advance mechanisms additionally are well suited for selectively moving a shutter-cocking element and thereby cock the camera shutter simultaneous with the foregoing advance of an exposed film unit. Further, to assure that only a single film unit is advanced from the film cassette to the camera spread rollers, or other film processing elements, the advance mechanism incorporates uni-directional elements which restrict the slide carriage to movement in a single direction during each portion of its film-advancing travel.

Although described with reference to cameras which use self-developing film units, those skilled in the art will appreciate that features of the invention can be used in other photographic cameras.

It will thus be seen that the objects set forth above, among those made apparent from the preceding description, are efficiently attained. Since certain changes may be made in the above constructions without departing from the scope of the invention, it is intended that all matter contained in the above description or shown in the accompanying drawings be interpreted as illustrative and not in a limiting sense.

It is also to be understood that the following claims cover all of the generic and specific features of the invention herein described, and all statements of the scope of the invention which, as a matter of language, might be said to fall therebetween.

Having described the invention, what is claimed as new and secured by Letters Patent is:

1. In a photographic camera of the self-developing type for use with, and adapted to seatingly receive, a film assemblage having a casing that contains at least one self-developing film unit, said film unit having a photosensitive surface and being disposed within said casing with said surface located for photographic exposure through a casing exposure opening, the casing further having (i) a frontal film unit exit passage, (ii) a wall portion extending between a frontal location and a back location and contiguous with said exposure aperture. and (iii) an access opening in said wall portion in communication with said exposure aperture and extending for a limited selected length in a front to back direction, said access opening being located for providing access from outside said casing to engage said one film unit therein and advance it out of said casing in a back to front direction through the casing exit opening, improved film advance means comprising A. slide means mounted on the camera for movement relative thereto along the back to front direction between first and second positions, and B film-engaging means mounted for movement by said slide means for engagement of said one film unit through the casing access opening for advancing the film unit in the back to front direction to project out of the casing exit opening, and for further engagement with such film unit other than through the access opening for continued further advance of the film unit further out of the casing, thereby to advance the film unit in the back to front direction by a distance by a distance greater than the length of said access opening.

2. In a camera as defined in claim 1, the further improvement comprising means for restricting said slide means from undergoing movement in a direction opposite to that which advances the film unit, during engagement of the film-engaging means with film unit being advanced in the camera.

3. In a camera as definedd in claim 2 and including frame and housing means, the further improvement wherein said movement-restricting means comprises a pawl member and a pawl-engaging member, one of said members being carried on said slide means and the other being carried on said frame and housing means, said members being arranged for selective engagement one with the other during the film-advancing movement of the slide means for providing said restriction of oppositely-directed motion, and for allowing relatively unrestricted film-advancing movement of the slide means relative to the frame and housing means.

4. In a camera as defined in claim 2, and including frame and housing means, the further improvement wherein said means for restricting movement of said slide means comprises a ratchet and a pawl engageable therewith, one of said ratchet and said pawl being carried on said slide means and the other of said ratchet and said pawl being secured to said frame and housing means.

5. In a camera as defined in claim 4, the further improvement comprising means for disengaging said pawl from said ratchet substantially when said slide means has reached its second position and means for re-engaging said pawl with said ratchet substantially when said slide means moves from the second position to the first position.

6. In a camera as defined in claim 1 and having a shutter cocking member movable to cock the camera shutter, the further improvement comprising cocking means connected with said shutter cocking member and selectively movable with said slide means for moving the shutter cocking member to cock the camera shutter during a selected portion of the movement of said slide means between said first and second positions.

7. In a camera as defined in claim 3 and having a shutter cocking member movable to cock the camera shutter, the further improvement A. wherein said pawl member is carried on said slide means and shifts relative thereto between at least a first condition for engaging said pawl-engaging member for effecting said restriction of movement, and a second, disengaged, condition, and B. further comprising cocking means connected with said shutter cocking member and selectively engaged by said pawl member in one only of said two conditions thereof for selective movement with said slide means, said cocking means upon such movement with said slide means moving the shutter cocking member to cock the camera shutter during a selected portion of the movement of said slide means between said first and second positions.

8. In a camera as defined in claim 6, further comprising selective release means arranged for allowing said cocking means to move independently of said slide means upon the completion of the shutter-cocking movement of the cocking means.

9. In a camera as defined in claim 1 and having frame and housing means, the further improvement comprising A. means forming a slot in said housing means extending longitudinal to said direction of motion of said slide means and having a length substantially equal to the distance between said first and second slide positions, and B. handle means disposed outside said camera housing means and coupled through said slot with said slide means for manual engagement to move said slide means between said first and second positions.

10. In a camera as defined in claim 1, the further improvement comprising biasing means coupled with said slide means and resiliently biasing it to said first position.

11. In a camera as defined in claim 1, the further improvement wherein said film-engaging means includes web means connected with said slide means and for interfitting into the casing of such a film assemblage seated within the camera, said web means interfitting, during said further engagement with the film unit, into the casing adjacent an edge of the casing exposure aperture to extend within the casing below the wall portion thereof, thereby to engage said one film unit and for movement therewith along a substantial portion of the span of the casing exposure aperture.

12. In a camera as defined in claim 11, the further improvement wherein said slide means and said web means are arranged to introduce said web means and said film-engaging means into the cassette, and remove them from within the cassette, at the cassette access opening.

13. In a camera as defined in claim 1, the further improvement wherein said film-engaging means includes, for said further engagement with the film unit, releasable film-gripping means mounted for movement by said slide means and disposed for receiving, with selective gripping engagement, a marginal portion of said one film unit projected out of the exit opening of a cassette seated in the camera and for effecting said further advance of that film unit.

14. In a camera according to claim 13, the further improvement comprising means interconnecting said slide means with said gripping means for moving said gripping means in a direction substantially parallel to and opposite from the movement of said slide means.

15. In a self-developing photographic camera for use with a film cassette of the type including a casing having
   i. an exposure window through which a foremost film unit therein can be exposed,
   ii. an exit in a frontal end through which a film unit can be moved subsequent to exposure,
   iii. an access opening proximal to a back end and communicating with the exposure window and having a fixed length in a first direction longitudinal to the movement of a film unit through the exit, and
   iv. a flange member extending in the longitudinal direction of the access opening and defining at least a portion of the edge of the exposure window intermediate the access opening and exit slot, and
at least a foremost film unit within the casing and having a photosensitive area openly in register with the exposure window and a frontal edge in alignment with the exit and a back edge in selective alignment with the access opening,
said camera having a housing and having frame means for receiving and positioning such a film cassette within the housing for exposure of the foremost film unit through the exposure window and oriented with said first direction aligned along a film advance direction, and
improved film advancing means comprising
   A. a slide carriage supported on said frame means for movement longitudinal to said film advance direction, said movement extending for a distance between a return position and a forward position by a length greater than said fixed length of the cassette access opening,
   B. an arm member arranged to extend into the cassette access opening and drivingly engage a back end of the foremost film unit for moving it along said film advance direction, and
   C. connector means connecting said arm member to said slide carriage and arranged to be received in said cassette casing, for disposing said arm member therein, under the casing flange during at least part of the motion of said slide carriage between said return and forward positions.

16. In a camera according to claim 15, the further improvement comprising slide-guiding means fixed on said frame means and mounting said slide carriage for movement thereof, said guiding means disposing said slide carriage to project said connector means in the cassette access opening when the carriage is in said return position and to introduce it under the cassette flange when said slide carriage moves from said return position to said forward position.

17. In a camera according to claim 15, the further improvement comprising pawl means and ratchet means, one of said pawl means and said ratchet means being carried on said slide carriage and the other being mounted with said frame means, said pawl means and said ratchet means being arranged for selective engagement during at least a portion of movement in one direction between said return position and said forward position for preventing oppositely directed movement of said carriage means until the completion of that movement.

18. In a camera according to claim 17, the further improvement comprising
   A. a spring means mounted with said pawl means for biasing said pawl means to either of first and second conditions, and
   B. cam means mounted with said ratchet means for shifting said pawl to said first condition prior to the commencement of said portion of carriage movement and for shifting said pawl to said second condition upon completion of said portion of movement.

19. In a camera according to claim 15, the further improvement comprising
   shutter cocking means slidably movable with said slide carriage during the travel thereof in a first direction between said return and forward positions and free from movement with the slide carriage during travel thereof in the opposite direction, and
   spring means coupled for moving said cocking means in said opposite direction upon completion of movement of said cocking means through selected travel in said first direction.

20. In a camera according to claim 19, the further improvement
   A. comprising slide-guiding means mounted on said frame means and mounting said slide carriage for said movement between said return and forward positions,
   B. wherein said clocking means includes a bracket member mounted on said guiding means for the movement thereof, and
   C. comprising releasable engagement means carried on one of said slide carriage and said bracket member for selectively engaging said cocking member for movement with said slide carriage in said first direction and releasable from said engagement during slide carriage movement in said opposite direction 21. In a camera according to claim 20, the further improvement wherein said releasable engagement means includes a pawl member mounted for movement with said carriage and selectively engageable with said frame means for preventing opposite movement of said slide carriage during movement thereof along a selected direction between said return and forward positions thereof.

22. In a self-developing photographic camera for use with a film cassette of the type including
a casing having
i. an exposure window through which a foremost film unit therein can be exposed,
ii. an exit in a frontal end through which a film unit can be moved subsequent to exposure,
iii. an access opening proximal to a back end and communicating with the exposure window and having a fixed length in a first direction longitudinal to the movement of a film unit through the exit, and
iv. a flange member extending in the longitudinal direction of the access opening and defining at least a portion of the edge of the exposure window intermediate the access opening and the exit slot, and
at least a foremost film unit within the casing and having a photosensitive area openly in register with the exposure window and a frontal edge in alignment with the exit and a back edge in selective alignment with the access opening,
said camera having a housing and having frame means for positioning such a film cassette within the housing for exposure of the foremost film unit through the exposure window and oriented with said first direction aligned along a film advancing direction, and
improved film advancing means comprising
A. a first slide carriage supported on said frame means for movement longitudinal to said film advance direction between a return position and a forward position,
B an arm member movable with said first slide carriage and arranged to extend into the cassette access opening and drivingly engage a back end of the foremost film unit for moving it by a first distance along said film advance direction, and upon movement of said carriage from said return to said forward position,
C. film unit griping means supported on said frame means for movement longitudinal to said film advance direction and coupled with said slide carriage for movement simultaneously therewith and oppositely directed therefrom, said film unit gripping means being so arranged that movement of said first slide carriage from said return position to said forward position causes said gripping means receivingly to engage, outside the cassette casing, the film unit advanced out of the casing exit by said arm member, and further such that subsequent movement of said first slide carriage back to said return position causes said gripping means to move the film unit receivingly engaged therein an additional distance along said film advance direction.

23. In a camera according to claim 22, the further improvement wherein
said first slide carriage is movable along said film advance direction between the return and forward positions by a distance of substantially the fixed length of the cassette access opening, and
further comprising means for moving said first slide carriage back and forth between said return and forward positions thereof.

24. In a camera according to claim 22, the further improvement comprising flexible cable means trained around pulley means and interconnecting said first slide carriage with said gripping means to effect said oppositely-directed movement of said gripping means relative to said slide carriage.

25. In a camera according to claim 24, the further improvement
wherein said flexible cable means is arranged for moving said gripping means in a first direction upon movement of said slide carriage in a second direction between said return and forward positions, and
further comprising a spring member connected between said gripping means and said camera frame means for resiliently urging said gripping means to move in said second direction, so that said gripping means moves in said second direction upon movement of said first slide carriage in said first direction.

26. In a camera according to claim 22, the further improvement comprising
a pawl mamber and a pawl-engageable surface member, one said member being mounted for movement with said first carriage and the other member being mounted with said housing means,
said members being selectively engageable to allow only unidirectional movement of said first slide carriage during travel from said return position to said forward position, and to allow only unidirectional movement thereof during travel from said forward position to said return position.

27. In a camera according to claim 26, the further improvement
A. further comprising spring means biasingly engaged with said pawl member for urging it into a normal position and
B. pawl-shifting means mounted with said pawl-engaging surface member for shifting said pawl member through said normal position to one of first and second positions during movement of said first slide carriage in the direction from said return position to said forward position and to the other said positions during the reverse motion of said first slide carriage.

28. In a camera according to claim 22, the further improvement in which film gripping means comprises
A. a wall member, and
B. a pawl member biased to engage said wall member,
C. said wall member and said pawl member being arranged for receiving therebetween a marginal portion of a film unit advanced out of said cassette casing, and for engaging the film unit with essentially no restraint on movement of the film unit forward along the advance direction relative to the gripping means and with substantially locking restraint for preventing opposite movement of the film unit relative to the gripping means.

29. In a camera according to claim 22, the further improvement comprising a second slide carriage commonly mounted for sliding movement with said first slide carriage and oppositely directed therefrom, and carrying said film unit gripping means.

30. In a photographic camera of the self-developing type for use with, and adapted to seatingly receive, a film assemblage having a casing that contains at least one self-developing film unit, said film unit having a photosensitive surface and being disposed within said casing with said surface located for photographic exposure through a casing exposure opening, the casing further having (i) a frontal film unit exit passage, (ii) a wall portion extending between a frontal location and a back location and contiguous with said exposure aperture, and (iii) an access opening in said wall portion in communication with said exposure aperture and extending for a limited selected length in front to back direction, said access opening being located for providing access from outside said cassette to engage the trailing edge of said one film unit therein to advance it out of said casing in a back to front direction through the casing exit opening, the improvement comprising A. processing means for applying a compressive force to said one film unit as it is advanced therepast, said processing means being located a distance in front of said frontal film unit exit substantially greater than said limited selected length of said access opening, and B. means for advancing said one film unit from said casing with its leading edge passing through said frontal film unit exit passage and into operative relationship with said processing means, said advancing means including a slide member mounted for reciprocal movement in a back to front direction and a pick arm located to at least initially extend along and into said access opening to engage with the trailing edge of said one film unit, said pick arm being responsive to the actuation of said slide member to exert a force on the trailing edge of said one film unit at a point in alignment with the lengthwise extension of said access opening to initiate the movement of the leading edge of said one film unit through said frontal film unit exit passage.

* * * * *